(12) United States Patent
Mallick et al.

(10) Patent No.: US 11,366,756 B2
(45) Date of Patent: Jun. 21, 2022

(54) LOCAL CACHED DATA COHERENCY IN HOST DEVICES USING REMOTE DIRECT MEMORY ACCESS

(71) Applicant: EMC IP Holding Company LLC, Hopkinton, MA (US)

(72) Inventors: Sanjib Mallick, Bangalore (IN); Vincent H. Westin, Marietta, GA (US); Gabriel Benhanokh, Tel-Aviv (IL); Ian Wigmore, Westborough, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 16/846,485

(22) Filed: Apr. 13, 2020

(65) Prior Publication Data
US 2021/0318960 A1    Oct. 14, 2021

(51) Int. Cl.
*G06F 12/0817* (2016.01)
*G06F 12/0808* (2016.01)
(Continued)

(52) U.S. Cl.
CPC ...... *G06F 12/0824* (2013.01); *G06F 12/0808* (2013.01); *G06F 12/0882* (2013.01); *G06F 12/1081* (2013.01); *G06F 2212/7207* (2013.01)

(58) Field of Classification Search
CPC ............. G06F 12/0824; G06F 12/0808; G06F 12/0882; G06F 12/1081; G06F 12/0815;
(Continued)

(56) References Cited

U.S. PATENT DOCUMENTS

| 6,567,397 B1 | 5/2003 | Campana et al. |
| 6,687,746 B1 | 2/2004 | Shuster et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

"SMB Direct," Microsoft, Apr. 5, 2018, https://docs.microsoft.com/en-us/windows-server/storage/file-server/smb-direct (Year: 2018).*
(Continued)

*Primary Examiner* — Michael Krofcheck
(74) *Attorney, Agent, or Firm* — Ryan, Mason & Lewis, LLP (57) ABSTRACT

A first host device establishes connectivity to a logical storage device of a storage system. The first host device obtains from the storage system host connectivity information identifying at least a second host device that has also established connectivity to the logical storage device, caches one or more extents of the logical storage device in a memory of the first host device, and maintains local cache metadata in the first host device regarding the one or more extents of the logical storage device cached in the memory of the first host device. In conjunction with processing of a write operation of the first host device involving at least one of the one or more cached extents of the logical storage device, the first host device invalidates corresponding entries in the local cache metadata of the first host device and in local cache metadata maintained in the second host device.

20 Claims, 3 Drawing Sheets

(51) Int. Cl.
*G06F 12/1081* (2016.01)
*G06F 12/0882* (2016.01)

(58) Field of Classification Search
CPC ............ G06F 12/0835; G06F 12/0833; G06F 12/0822; G06F 12/0831; G06F 2212/7207
See application file for complete search history.

(56) References Cited

U.S. PATENT DOCUMENTS

| | | | |
|---|---|---|---|
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,467,265 B1* | 12/2008 | Tawri ................. | G06F 12/0813 |
| | | | 711/161 |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,544,371 B1* | 1/2017 | Randhawa .......... | H04L 67/1097 |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0109604 A1* | 5/2008 | Reilly ................. | G06F 12/0835 |
| | | | 711/118 |
| 2008/0201458 A1 | 8/2008 | Salli | |
| 2010/0100667 A1* | 4/2010 | Kang ................. | G06F 12/0246 |
| | | | 711/103 |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2013/0117766 A1 | 5/2013 | Bax et al. | |
| 2014/0105068 A1 | 4/2014 | Xu | |
| 2015/0067001 A1* | 3/2015 | Koltsidas ............ | G06F 16/172 |
| | | | 707/824 |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 15/795,653 filed in the name of Maneesh Pusalkar et al. Oct. 27, 2017, and entitled "Storage System with Network-Wide Configurable Device Names."

U.S. Appl. No. 16/697,393 filed in the name of Vinay G. Rao et al. Nov. 27, 2019, and entitled "Automated Seamless Migration of Logical Storage Devices."

U.S. Appl. No. 16/710,828 filed in the name of Amit Pundalik Anchi et al. Dec. 11, 2019, and entitled "Automated Seamless Migration with Signature Issue Resolution."

* cited by examiner

HOST DEVICE LOCAL CACHE METADATA TABLE
FOR LOGICAL STORAGE DEVICE *i*

| EXTENT 1 ENTRY | LOCALLY CACHED? | EXTENT ADDRESS IN LOCAL CACHE |
| EXTENT 2 ENTRY | LOCALLY CACHED? | EXTENT ADDRESS IN LOCAL CACHE |
| ... | | |
| EXTENT X ENTRY | LOCALLY CACHED? | EXTENT ADDRESS IN LOCAL CACHE |

FIG. 3

LOCAL CACHED DATA COHERENCY IN HOST DEVICES USING REMOTE DIRECT MEMORY ACCESS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. Host devices may be configured to implement local caching of data retrieved from the storage system. However, it can be difficult under conventional practice to maintain local cached data coherency among different host devices that access the same logical storage devices of the storage system.

SUMMARY

Illustrative embodiments provide techniques for providing local cached data coherency in host devices using remote direct memory access (RDMA).

For example, in some embodiments, host devices are connected to a storage array or other storage system using a communication protocol that supports RDMA transfers, such as NVMe over InfiniBand (IB). Such embodiments allow each host device to access the memory of the other host devices using RDMA over the network without the need for an additional external link or other separate communication mechanism between the host devices. Each such host device illustratively has local memory, comprising one or more cache cards or other types of memory devices, configured for local caching of extents of one or more logical storage devices of the storage system.

The above-noted problems relating to maintaining local cached data coherency are overcome at least in part by providing an RDMA based implementation in which each host device knows the location at which other host devices store their respective local cache metadata, and can therefore directly invalidate entries in the local cache metadata of other host devices, without involvement of remote threads.

In some embodiments, at least a portion of the local cached data coherency functionality is implemented in at least one host driver of each host device, such as multi-path input-output (MPIO) drivers of the respective host devices. Other types of host drivers can be used in place of or in addition to MPIO drivers.

In one embodiment, an apparatus comprises a first host device comprising a processor coupled to a memory. The first host device is configured to establish connectivity to a logical storage device of a storage system, to obtain from the storage system host connectivity information identifying at least a second host device that has also established connectivity to the logical storage device of the storage system, to cache one or more extents of the logical storage device in the memory of the first host device, and to maintain local cache metadata in the first host device regarding the one or more extents of the logical storage device cached in the memory of the first host device.

In conjunction with processing of a write operation of the first host device involving at least one of the one or more cached extents of the logical storage device, the first host device is further configured to invalidate corresponding entries in the local cache metadata of the first host device and in local cache metadata maintained in the second host device.

The memory of the first host device illustratively comprises one or more cache cards of the first host device, although a wide variety of other types of memory devices, or combinations of different memory devices of different types, can be used.

The extents of the logical storage device illustratively comprises one or more pages of the logical storage device.

In some embodiments, the first host device further comprises an MPIO layer comprising at least one MPIO driver configured to control delivery of IO operations from the first host device over selected paths to particular ports of the storage system, with the MPIO driver controlling performance of at least a subset of the above-noted establishing, obtaining, caching, maintaining and invalidating.

In obtaining from the storage system host connectivity information identifying at least a second host device that has also established connectivity to the logical storage device of the storage system, the first host device illustratively obtains the connectivity information directly from the storage system utilizing an in-band communication mechanism in which one or more commands in a designated storage protocol, such as above-noted SCSI or NVMe protocols, are sent from the first host device to the storage system. For example, the one or more commands may more particularly comprise at least a host registration command sent from the first host device to the storage array in conjunction with the first host device establishing connectivity to the logical storage device.

In some embodiments, the first host device is further configured to store information specifying a location of the local cache metadata maintained in the second host device and to directly invalidate entries in the local cache metadata of the second host device via RDMA. The first host device can similarly store information specifying locations of local cache metadata in one or more other host devices, so as to allow it to directly invalidate entries in that local cache metadata via RDMA.

The first host device in some embodiments is further configured to maintain a host connectivity information table that stores, for each a plurality of other host devices including the second host device, identifiers of one or more logical storage devices of the storage system to which those other host devices have established connectivity.

The local cache metadata maintained in the first host device illustratively comprises a logical storage device extents table having a plurality of entries for respective extents of the logical storage device, with each such entry comprising an indication of whether or not the corresponding extent is cached in the memory of the first host device. If the corresponding extent is cached in the memory of the first host device, the logical storage device extents table further comprises an address in the memory of the first host device at which the corresponding extent is cached. Local cache metadata comprising similar logical storage device extents tables are illustratively maintained by the other host devices.

In some embodiments, the first host device is further configured, in conjunction with processing of a read operation, to determine if one or more extents targeted by the read operation are cached in the memory of the first host device. Responsive to the one or more extents being cached in the memory of the first host device, the first host device reads the one or more extents from the memory, and returns the one or more extents to an application that generated the read operation. Responsive to the one or more extents not being cached in the memory of the first host device, the first host device reads the one or more extents from the storage system, returns the one or more extents to the application that generated the read operation, caches the one or more extents in the memory of the first host device, and updates the local cache metadata maintained in the first host device.

Additionally or alternatively, the first host device is further configured, in conjunction with processing of the write operation, to identify one or more additional host devices, including the second host device, that have established connectivity to the logical storage device, to determine locations in respective ones of the one or more additional host devices of local cache metadata maintained in the one or more additional host devices, to invalidate entries corresponding to one or more extents targeted by the write operation in the local cache metadata of the first and additional host devices, to send the write operation to the storage system, and responsive to an acknowledgement of the write operation from the storage system, to acknowledge completion of the write operation to an application that generated the write operation.

Invalidating entries in the local cache metadata of the first and additional host devices illustratively comprises invalidating the entries of the local cache metadata of the one or more additional host devices via RDMA.

In some embodiments, the first and second host devices are part of a first group of host devices each having RDMA functionality, and the storage system is shared by the first group of host devices and a second group of host devices, with the second group of host devices each not having RDMA functionality, wherein different types of write processing are performed by the storage system depending on whether a given write operation is received from a host device of the first group or a host device of the second group, in order to achieve local cached data coherency across both of the first and second groups.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
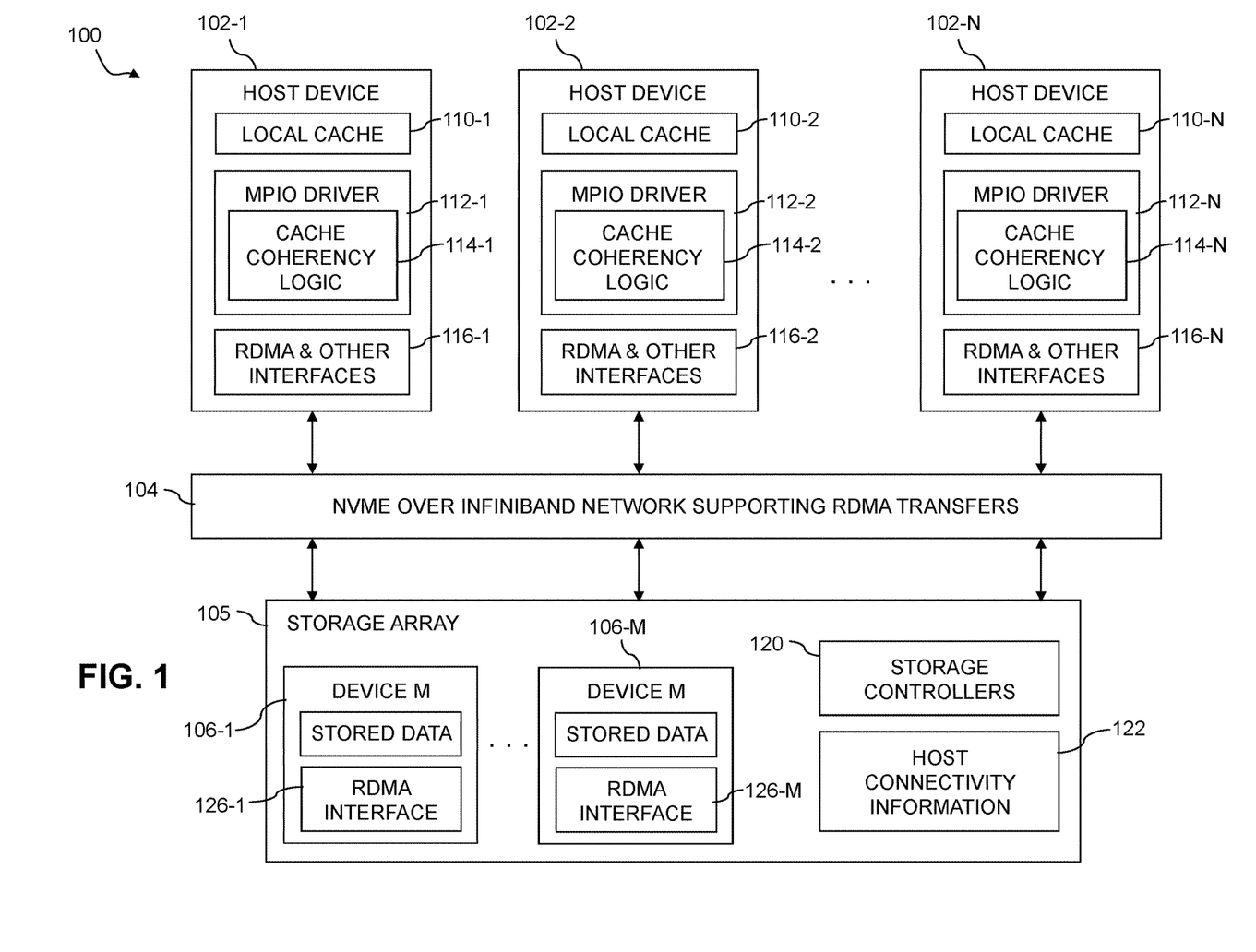
FIG. 1 is a block diagram of an information processing system configured with functionality for local cached data coherency using RDMA in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a network 104 with at least one storage array 105. The network 104 in this embodiment comprises an NVMe over IB network supporting RDMA transfers, although other types of networks can be used in other embodiments. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

Although the network 104 in the FIG. 1 embodiment is illustratively implemented as an NVMe over D3 network, additional or alternative networks can be used in other embodiments, including one or more storage area networks (SANs).

The network 104 may therefore be implemented using multiple networks of different types to interconnect storage system components. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols. As a more particular example, some embodiments may utilize one or more high-speed local networks in which associated processing devices communicate with one another utilizing Peripheral Component Interconnect express (PCIe) cards of those devices, and networking protocols such as IB, Gigabit Ethernet or Fibre Channel. Numerous alternative networking arrangements are possible in a given embodiment, as will be appreciated by those skilled in the art.

The host devices 102 comprise respective local caches 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for local cached data coherency. Such functionality is provided at least in part using respective instances of cache coherency logic 114-1, 114-2, . . . 114-N implemented within the MPIO drivers 112. The host devices 102 are further assumed to include additional components not explicitly shown, such as respective sets of IO queues. The MPIO drivers 112 of the multi-path layer also provide path selection functionality for selecting paths for delivery of IO operations from the IO queues to the storage array 105.

The MPIO drivers 112 may comprise, for example, otherwise conventional MPIO drivers, such as PowerPath® drivers from Dell EMC, suitably modified in the manner disclosed herein to provide functionality for local cached data coherency. Other types of MPIO drivers from other driver vendors may be suitably modified to incorporate functionality for local cached data coherency as disclosed herein.

In the present embodiment, the host devices 102 are connected to the storage array 105 via network 104, which is illustratively implemented using a communication protocol that supports RDMA transfers, such as NVMe over IB. The host devices 102-1, 102-2, . . . 102-N include respective interfaces 116-1, 116-2, . . . 116-N, which illustratively include RDMA interfaces as well as other types of interfaces. The storage devices 106-1, . . . 106-M include respective RDMA interfaces 126-1, . . . 126-M.

Such an arrangement allows each of the host devices 102 to access the local caches 110 of the other host devices 102 using RDMA over the network 104 without the need for additional external links between the host devices 102. The host devices 102 in the present embodiment can also directly access the storage devices 106 via their respective RDMA interfaces 126, also over the network 104.

The local caches 110 are examples of what are more generally referred to herein as respective "memories" of the host devices 102. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches 110 include one or more memory cards or other memory devices, such as, for example, an NVMe over PCIe cache card, a local flash drive or other type of NVM storage drive, or combinations of these and other memory devices.

Such memory devices are illustratively managed at least in part by the MPIO drivers 112 in conjunction with processing of IO operations generated by the respective host devices 102. The memory devices may alternatively be managed by other types of host device drivers or as respective local drives on the host devices 102.

The MPIO driver 112-1 is configured to deliver IO operations selected from its corresponding set of IO queues to the storage array 105 via selected ones of multiple paths over the network 104. The sources of the IO operations stored in the set of IO queues illustratively include respective processes of one or more applications executing on the host device 102-1. For example, IO operations can be generated by each of multiple processes of a database application running on the host device 102-1. Such processes issue IO operations for delivery to the storage array 105 over the network 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues to the storage array 105 over particular paths via the network 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Some implementations of the system 100 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Selecting a particular one of multiple available paths for delivery of a selected one of the IO operations of the set of IO queues of the host device 102-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to establish connectivity to a logical storage device of a storage array 105, to obtain from the storage array 105 host connectivity information identifying at least a second host device that has also established connectivity to the logical storage device of the storage array 105, and to cache one or more extents of the logical storage device in the local cache 110-1 of the first host device 102-1. The local cache 110-1 is an example of what is more generally referred to herein as a "memory" of the host devices 102-1, and other types of host device memories can be used in other embodiments.

The term "establishing connectivity" as used herein is intended to be broadly construed, so as to encompass a wide variety of different techniques for initially configuring or otherwise configuring the host device 102-1 to access a particular logical storage device of the storage array 105. The term should not be construed as requiring that actual access to that logical storage device has already occurred, for example, via generation of IO operations targeted to extents of that logical storage device.

The MPIO driver 112-1 further maintains local cache metadata in the first host device 102-1 regarding the one or more extents of the logical storage device cached in the local cache 110-1 of the first host device 102-1. Moreover, in conjunction with processing of a write operation of the first host device 102-1 involving at least one of the one or more cached extents of the logical storage device, the MPIO driver 112-1 invalidates corresponding entries in the local cache metadata of the first host device 102-1 and in local cache metadata maintained in the second host device 102-2.

The local cache 110-1 of the first host device 102-1 illustratively comprises one or more cache cards of the first host device 102-1, although a wide variety of different local cache arrangements using other types of memory can be used.

The extents of the logical storage device illustratively comprise one or more pages of the logical storage device. Such extents are cached in the local cache 110-1 and their caching is tracked using local cache metadata as disclosed herein.

The host connectivity information obtained by the MPIO driver 112-1 illustratively comprises at least a portion of host connectivity information 122 maintained by the storage array 105.

Although in illustrative embodiments, the MPIO driver 112-1 is configured to control delivery of IO operations from the first host device 102-1 over selected paths to particular ports of the storage array 105, and also to control performance of at least a subset of the above-noted establishing, obtaining, caching, maintaining and invalidating associated with local cached data coherency, this is by way of example only, and other arrangements of host device components can be used to perform such functions in other embodiments.

A more detailed example algorithm representing an illustrative embodiment comprising at least portions of the above-noted establishing, obtaining, caching, maintaining and invalidating associated with local cached data coherency will be described in more detail below in conjunction with FIG. 2. Other types of algorithms may be performed by one or more of the host devices 102 in implementing local cached data coherency in other embodiments.

The MPIO driver 112-1 in obtaining from the storage array 105 host connectivity information identifying at least a second host device 102-2 that has also established connectivity to the logical storage device of the storage array 105 more particularly obtains the connectivity information directly from the storage array 105 utilizing an in-band communication mechanism in which one or more commands in a designated storage protocol are sent from the first host device 102-1 to the storage array 105. The one or more commands illustratively comprise at least a host registration command sent from the first host device 102-1 to the storage array in conjunction with the first host device 102-1 establishing connectivity to the logical storage device, although numerous other types of commands as well as combinations of multiple commands can additionally or alternatively be used.

In some embodiments, the MPIO driver 112-1 of the first host device 102-1 is further configured to store information specifying a location of the local cache metadata maintained in the second host device 102-2 and to directly invalidate entries in the local cache metadata of the second host device 102-2 via RDMA.

The MPIO driver 112-1 of the first host device 102-1 is further configured to maintain a host connectivity information table that stores, for each a plurality of other host devices including the second host device 102-2, identifiers of one or more logical storage devices of the storage array 105 to which those other host devices have established connectivity. As indicated above, the host connectivity information stored in the host connectivity information table illustratively comprises at least a portion of the host connectivity information 122 maintained by the storage array 105. For example, different portions of the host connectivity information 122 can correspond to different ones of the host devices 102 and/or different logical storage devices that are accessible to those host devices 102. A wide variety of different types and arrangements of host connectivity information are possible, and the term "host connectivity information" as used herein is intended to be broadly construed.

In some embodiments, the local cache metadata maintained in the first host device 102-1 comprises a logical storage device extents table having a plurality of entries for respective extents of the logical storage device. Each such entry illustratively comprises an indication of whether or not the corresponding extent is cached in the local cache 110-1 of the first host device 102-1, and if the corresponding extent is cached in the local cache 110-1 of the first host device 102-1, the entry further comprises an address in the local cache 110-1 of the first host device 102-1 at which the corresponding extent is cached.

A more detailed example of a local cache metadata table of this type will be described below in conjunction with FIG. 3. Additional or alternative arrangements of local cache metadata can be maintained by a given one of the host devices 102 for one or more logical storage devices to which that host device has established connectivity.

The MPIO driver 112-1 of the first host device 102-1 is further configured, in conjunction with processing of a read operation, to determine if one or more extents targeted by the read operation are cached in the local cache 110-1 of the first host device 102-1. Responsive to the one or more extents being cached in the local cache 110-1 of the first host device 102-1, the MPIO driver 112-1 reads the one or more extents from the local cache 110-1, and returns the one or more extents to an application that generated the read operation on the first host device 102-1. Responsive to the one or more extents not being cached in the local cache 110-1 of the first host device 102-1, the MPIO driver 112-1 reads the one or more extents from the storage array 105, returns the one or more extents to the application that generated the read operation, caches the one or more extents in the local cache 110-1 of the first host device 102-1, and updates the local cache metadata maintained in the first host device 102-1.

The MPIO driver 112-1 of the first host device 102-1 is further configured, in conjunction with processing of the previously-mentioned write operation, to identify one or more additional host devices 102, including the second host device 102-2, that have established connectivity to the logical storage device, to determine locations in respective ones of the one or more additional host devices 102 of local cache metadata maintained in the one or more additional host devices 102, and to invalidate entries corresponding to one or more extents targeted by the write operation in the local cache metadata of the first and additional host devices 102. The MPIO driver 112-1 of the first host device 102-1 then sends the write operation to the storage array 105 over a selected path. Responsive to an acknowledgement of the write operation from the storage array 105, the MPIO driver 112-1 acknowledges completion of the write operation to an application that generated the write operation.

In some embodiments, invalidating entries in the local cache metadata of the first and additional host devices 102 illustratively comprises invalidating the entries of the local cache metadata of the one or more additional host devices 102 via RDMA, over the network 104 which is illustratively implemented as an NVMe over D3 network supporting RDMA transfers, including RDMA transfers between the host devices 102 and between a given one of the host devices and the storage devices 106, using their respective RDMA interfaces that are illustratively part of interfaces 116 and interfaces 126.

The first host device 102-1 and one or more additional host devices, including the second host device 102-2, are each further configured to remove any invalidated entries from local cache metadata in that host device, and to release corresponding space in a local cache of that host device so as to thereby make the space available for caching of other extents in the local cache of that host device.

In some embodiments, the host devices 102 can include different groups of host devices, such as a group of host devices with RDMA functionality and a group of host devices without such functionality. For example, the first and second host devices 102 may be part of a first group of host devices each having RDMA functionality, with the storage array 105 being shared by the first group of host devices and a second group of host devices, and the second group of host devices 102 each not having RDMA functionality. In such arrangements, the host devices with RDMA functionality are assumed to have respective local caches, but the host devices without RDMA functionality do not have local caches. The storage array 105 in some embodiments utilizes its host connectivity information 122 to determine which host devices are in which of the two groups. More than two different groups of host devices separated based on additional or alternative characteristics may be present.

The storage array 105 in some embodiments of this type is illustratively configured to perform different types of write processing depending on whether a given write operation is received from a host device of the first group or a host device of the second group, in order to ensure that local cached data coherency is maintained despite the fact that the host devices of the second group do not have RDMA functionality.

For example, assume that the information processing system 100 is configured such that some of the host devices 102 have local memory and RDMA capability ("Group A hosts") and some of the host devices 102 do not have local memory and RDMA capability ("Group B hosts"). Such an arrangement is illustratively used in a large scale cluster, such as an Oracle Real Application Cluster (RAC) or other cluster comprising a relatively large number of cluster nodes, possibly numbering in the hundreds, thousands or more.

The hosts belonging to Group A are illustratively the "faster" cluster nodes responsible for operations such as database reporting and processing, and the other hosts belonging to Group B and are illustratively the "slower" cluster nodes and are responsible for operations such as database scans, backup, etc. The storage array 105 is assumed to be aware of which hosts belong to Group A and which hosts belong to Group B, possibly via a combination of host registration information and knowledge of which hosts have RDMA connectivity with the storage array 105. Such information is illustratively part of the host connectivity information 122 maintained by the storage array 105.

When a host that belongs to Group A performs a write, the write processing will be performed as described above and elsewhere herein in order to ensure local cache coherency through the use of RDMA to invalidate local cache entries in other hosts. However, if one of the hosts belonging to Group B performs a write, that host cannot notify the hosts of Group A as it has no RDMA capability.

In such cases, the storage array 105 receives the write but as indicated above provides a different type of write processing for such writes received from hosts belonging to Group B. This illustratively involves the storage array 105 holding off on acknowledging the write to the sending host of Group B until the storage array 105 itself invalidates the write extents in all Group A hosts using RDMA in a manner similar to that described above. After all write extents in the Group A hosts have been invalidated by the storage array 105 via RDMA, the storage array 105 will acknowledge the write to the sending host of Group B. By definition (e.g., as defined by the SCSI specification and accepted by other multiple-initiator protocols), an extent being written has undefined data until the write is acknowledged. This means that a read to that extent may return the old data, the new data or any combination and all are valid responses. Therefore, while the storage array 105 holds off on sending the acknowledgement of the write, any data returned for access to that extent is considered valid. Accordingly, there is no atomicity requirement for the update to Group A hosts.

These and other illustrative embodiments herein can therefore provide local cached data coherency even in a multiple host environment in which not all of the hosts have RDMA capability. This is in contrast to conventional cluster-enabled write back solutions that typically require all cluster members to have the same configuration. Illustrative embodiments overcome this significant drawback of conventional practice, allowing a large scale cluster to have multiple distinct host configurations, while also being less costly to implement.

As indicated previously, additional examples of local cached data coherency are described below in conjunction with the illustrative embodiments of FIGS. 2 and 3.

In the FIG. 1 embodiment, the storage array 105 comprises a plurality of storage controllers 120 and one or more instances of host connectivity information 122. The host connectivity information 122 illustratively comprises information regarding one or more of the other host devices 102 that is utilized by the MPIO drivers 112 to provide local cached data coherency for their respective host devices 102 as disclosed herein.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The above-noted host connectivity information is illustratively obtained by the MPIO driver 112-1 and stored in one or more data structures of a kernel-space portion of the MPIO driver 112-1. The kernel-space portion of the MPIO driver 112-1 is illustratively part of an operating system of the host device 102-1. Alternatively, other components of the host device 102-1 can be involved in storage of the host connectivity information obtained from the storage array 105, possibly using other types of data structures or storage arrangements.

As indicated above, the host connectivity information can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, the information can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection.

The host management software in some embodiments comprises MPIO management software, such as Power-Path® Management Appliance (PPMA) software, which can be used to facilitate identification of host connectivity to the storage array 105 for inclusion in the host connectivity information 122 as well as to facilitate coordination between multiple host devices. Such host management software in some embodiments is illustratively implemented on an MPIO management station that is separate from the host devices 102, although numerous other arrangements are possible. The host connectivity information is illustratively part of the connectivity information 122 of the storage array 105, and can be accessed by the MPIO drivers 112 directly and/or via the MPIO management station.

These and other functions related to local cached data coherency that are referred to herein as being performed by or under the control of the MPIO driver 112-1 can in some embodiments be performed at least in part outside of the MPIO driver 112-1, such as in the host device 102-1 generally.

More particular examples of the above local cached data coherency arrangements will be described elsewhere herein. Other types of local cached data coherency arrangements can be used in other embodiments.

As indicated previously, absent use of techniques for local cached data coherency as disclosed herein, performance of the storage system in processing IO requests received from a host device can be adversely impacted. For example, it can be difficult under conventional practice to maintain local cached data coherency among different host devices that access the same logical storage devices of the storage system.

Such drawbacks are advantageously overcome in illustrative embodiments herein by utilization of a multi-path layer comprising one or more of the MPIO drivers 112 to provide local cached data coherency via RDMA as described above. These embodiments therefore provide a significant advance over conventional techniques.

The above-described functions associated with local cached data coherency in the MPIO driver 112-1 are carried out at least in part under the control of its cache coherency logic 114-1. For example, the cache coherency logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the network 104 with the storage array 105. The MPIO drivers 112 of such other host devices are each similarly configured to deliver JO operations from its corresponding one of the sets of JO queues to the storage array 105 over selected paths through the network 104, and to perform the disclosed functionality for local cached data coherency.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support local cached data coherency.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, network 104, storage array 105, storage devices 106, local caches 110, MPIO drivers 112 and instances of cache coherency logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 216, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
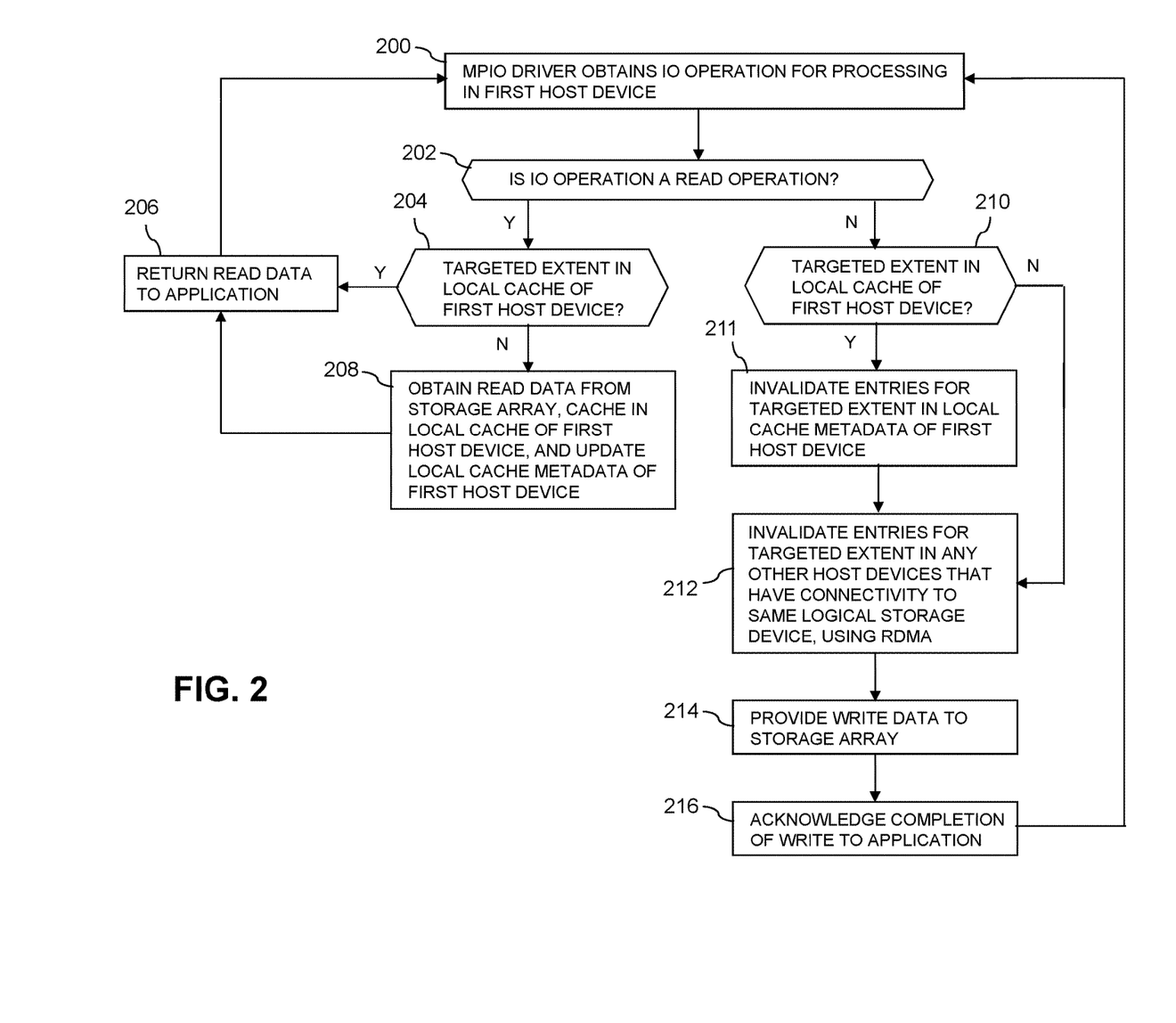
FIG. 2 is a flow diagram of a process for local cached data coherency using RDMA in an illustrative embodiment.

The steps of the FIG. 2 process are illustratively performed at least in part by or under the control of an MPIO driver of a given host device. For example, portions of the process may be carried out under the control of software, firmware and/or hardware of an instance of cache coherency logic deployed within the MPIO driver. Accordingly, the FIG. 2 process may be viewed as an example of an algorithm performed by the cache coherency logic 114-1 of the MPIO driver 112-1 of host device 102-1. Other arrangements of host device components and/or other system components can be configured to perform at least portions of one or more of the steps in other embodiments.

In step 200, the MPIO driver obtains an IO operation for processing in the first host device. It is assumed in this embodiment that the IO operation may comprise a read operation or a write operation, and that a given IO operation targets a particular extent corresponding to a portion of a logical storage volume, although numerous other arrangements are possible. For example, a given read or write operation may target multiple extents, and the disclosed process can readily accommodate such operations. The MPIO driver illustratively obtains the IO operation by selecting it from one of a plurality of IO queues of the first host device. A given such IO operation is illustratively generated by an application running on the first host device, and is queued in a given one of the IO queues of the first host device with other operations generated by that application, and possibly other applications.

In step 202, the MPIO driver determines if the IO operation is a read operation or a write operation. If the IO operation is a read operation, the process moves to step 204, and otherwise moves to step 210 as indicated.

In step 204, the MPIO driver determines if an extent that is targeted by the read operation is already present in a local cache of the first host device. If the targeted extent is already present in the local cache of the first host device, the process moves to step 206, and otherwise moves to step 208 as indicated.

In step 206, the MPIO driver returns the targeted extent as read data to the application that generated the read operation. If step 206 is reached directly from step 204 so as to bypass step 208, the MPIO driver returns the read data to the application directly from the local cache of the first host device, without sending the read operation to the storage array for processing. The process then returns to step 200 to process another IO operation, which again may be a read operation or a write operation.

In step 208, the MPIO driver obtains the read data from the storage array, in response to sending the read operation to the storage array for processing. The MPIO driver caches the obtained read data in the local cache of the first host device, and updates local cache metadata of the first host device to reflect that the targeted extent is now present in the local cache. The process then moves to step 206, in which the MPIO driver returns the targeted extent as read data to the application that generated the read operation, after which the process then returns to step 200 to process another IO operation, which again may be a read operation or a write operation.

As described above, if the determination in step 202 indicates that the obtained IO operation is a write operation, the process moves to step 210.

In step 210, the MPIO driver determines if an extent that is targeted by the write operation is already present in a local cache of the first host device. If the targeted extent is already present in the local cache of the first host device, the process moves to step 211, and otherwise moves to step 212 as indicated.

In step 211, the MPIO driver invalidates entries for the targeted extent in local cache metadata of the first host device. This local invalidation step 211 is bypassed if the targeted extent is not already present in the local cache of the first host device, as indicated.

In step 212, the MPIO driver invalidates entries for the targeted extent in local cache data of any other host device that has connectivity to the same logical storage device. As described elsewhere herein, such invalidation illustratively occurs between the first host device and the other host devices via RDMA, for example, using RDMA transfers carried out via an NVMe over IB network or other type of network configured to support such transfers.

In step 214, the MPIO driver provides the write data to the storage array, illustratively by sending the write operation to the storage array for processing.

In step 216, the MPIO driver acknowledges completion of the write operation back to the application that generated the write operation, illustratively after first receiving a corresponding acknowledgement from the storage array. The process then returns to step 200 to process another IO operation, which again may be a read operation or a write operation.

Multiple instances of the FIG. 2 process can be performed at least in part in parallel with one another for different IO operations within the first host device.

Also, multiple additional instances of the FIG. 2 process may be performed in respective additional host devices that share the storage array. Other embodiments can include multiple storage arrays, with the disclosed functionality for local cached data coherency being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for local cached data coherency. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different local cached data coherency arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
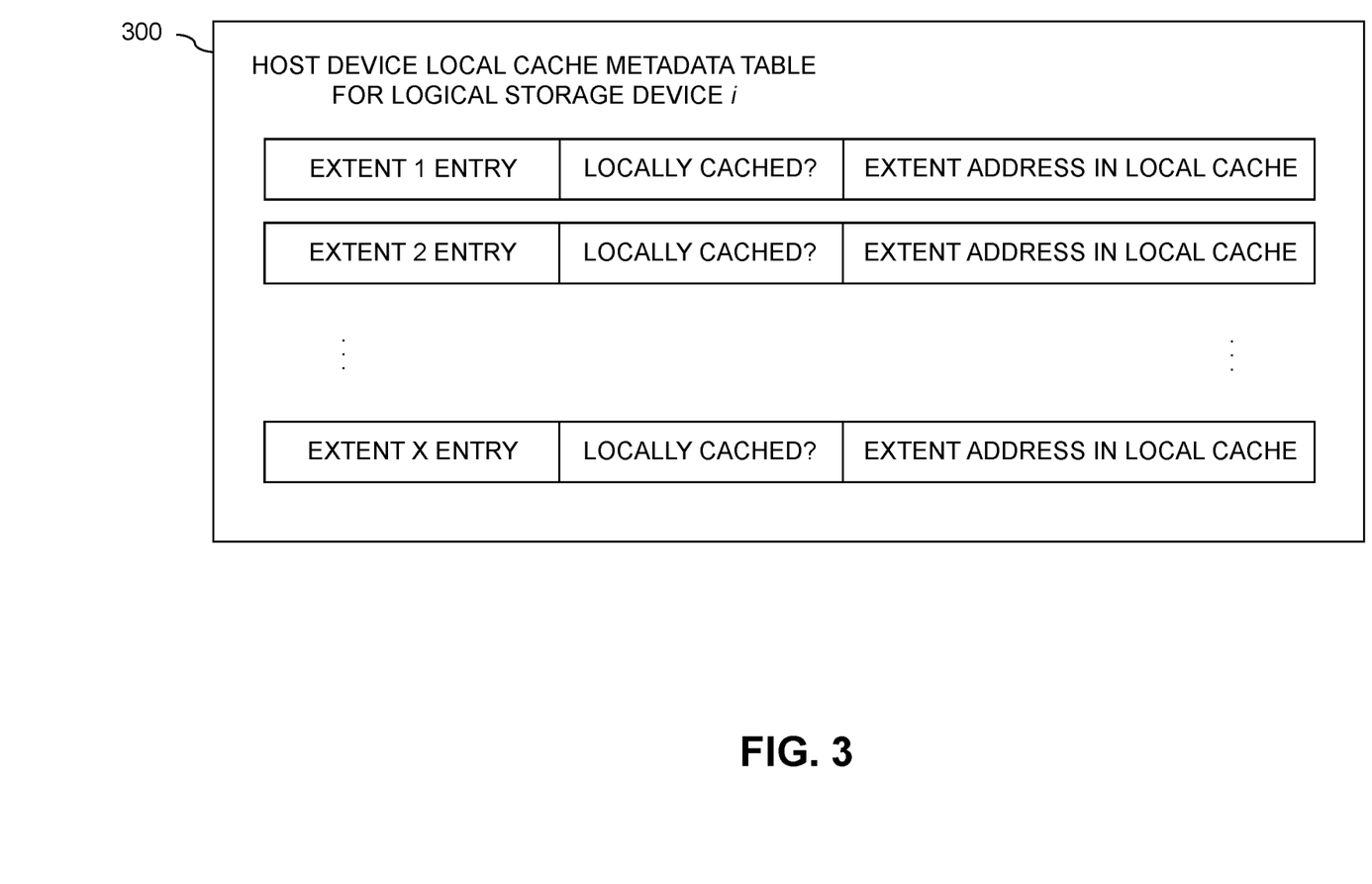
FIG. 3 shows an example of local cache metadata maintained by a host device in an illustrative embodiment.

Referring now to FIG. 3, an example of local cache metadata maintained by one of the host devices 102 in an illustrative embodiment is shown. The local cache metadata more particularly comprises a host device local cache metadata table 300 maintained by a given one of the host devices 102 for a particular logical storage device denoted as logical storage device i. Other similar tables may be maintained by the given host device for other logical storage devices to which that host device has established connectivity as described elsewhere herein. In addition, such tables or sets of tables are illustratively maintained by each of the host devices 102 that share the storage array 105.

The local cache metadata table 300 is an example of what is more generally referred to herein as a "logical storage device extents table." Such a table is considered a type of local cache metadata, and numerous other local cache metadata arrangements can be used, based on other types of data structures. Local cache metadata in a given embodiment can be stored in a data structure of a multi-path layer of the host device and/or in other data structures elsewhere in the host device.

The local cache metadata table 300 in the present embodiment includes a plurality of entries containing metadata for respective extents of the logical storage device. The entries in this embodiment illustratively correspond to respective extents denoted Extent 1, Extent 2, . . . Extent X, each denoting a particular block of size Y kilobytes (KB) (e.g., Y=4, 8, 16, etc.) in the logical storage device. Each such entry in the local cache metadata table 300 illustratively comprises an indication of whether or not the corresponding extent is cached in the local cache of the given host device, and if the corresponding extent is cached in the local cache of the given host device, an extent address in the local cache of the given host device at which the corresponding extent is cached.

Another additional embodiment implements an algorithm that is illustratively performed by the instances of cache coherency logic 114 of the respective MPIO drivers 112, possibly in cooperation with other host device components.

It is assumed in this embodiment that an MPIO driver receives write and read commands from applications executing on its host device, illustratively via the host device operating system (OS). For example, when the MPIO driver receives a write command from an application, it sends the write command to the storage array 105, but when the MPIO driver receives a read command from an application, the MPIO driver first checks whether the data is cached locally in the host local memory. If the data is cached locally in the host local memory, the MPIO driver reads the data from the host local memory and sends it to the application. If the data is not cached locally, the MPIO driver reads the data from the storage array 105, sends it to the application, and also stores the data in the host local memory.

As indicated previously, such local caching can lead to coherency issues when more than one host is communicating with the same logical storage device of the storage array 105. As long as only one host is managing the device there is no coherency issue, however when two or more hosts manage the device, coherency issues can arise. For example, if one host caches a certain addresses range, and a second host writes new data to the storage array 105 for the same address range, the data cached in the local memory of the first host is stale and should be discarded before the write from the second host is completed.

Illustrative embodiments disclosed herein address these and other cache coherency issues by providing an RDMA based implementation where each host knows the address in which other hosts keep metadata for the stored data, and can invalidate the metadata directly, without involvement of remote threads.

Some embodiments include at least a subset of the components and related functionality described below.

It is assumed that each host has a local memory (e.g., a cache card) and an MPIO driver (e.g., a PowerPath® driver) managing that local memory. It is further assumed that the local memory comprises a cache card.

Each host maintains a table with information regarding the other hosts and which logical devices are configured to those hosts. This information is illustratively received from the storage array 105 using vendor unique commands, such as a PowerPath® host registration read from the storage array 105. Other types of commands can be used in other embodiments in order to allow the hosts to obtain this information.

Each host has a static metadata table describing logical storage device extents. This table is referred to herein as a device extents metadata table. Each entry in the table will describe one extent. Extent size is illustratively Y KB (e.g., Y=4, 8, 16, etc.) Each entry contains the following elements:

1. An indicator of whether or not the extent is cached in the cache card.

2. The address where the data of that extent is cached. The address is illustratively in a least recently used (LRU) list of extents implemented on the cache card. Other types of caching techniques such as least frequently used (LFU) can be used in other embodiments.

Each host maintains its own internal device extents metadata table. However, other hosts are aware of the table start location and the logical storage devices each host manages. Since the table start location, structure and managed devices are known, each host can calculate the address of any device extent in any other host that has the device.

When the MPIO driver receives a read command from the host OS/application, the MPIO driver performs a process that includes the following steps:

1. Checks in its local device extents metadata table whether the requested data range is cached locally on its host.

2. If the data is not cached, reads the data from the storage array, sends it to the OS/application, stores it in the local cache card, and updates its local device extents metadata table.

3. If the data is cached locally, reads the data from the local cache card and sends it to the OS/application.

When the MPIO driver receives a write command from the host OS/application, the MPIO driver performs a process that includes the following steps:

1. Determines which other hosts are communicating with the device, from the host and their devices table stored on the host.

2. Calculates the address of the extents describing the write command payload range, in the device extents metadata tables of each of the other hosts communicating with the device.

3. Uses RDMA to invalidate the above extents in the other hosts device extents metadata table, by marking the corresponding entries as "invalid." This will effectively make these extents "not cached" for that host.

4. Sends the data to the storage array.

5. Acknowledges the write to the OS/application.

Each of the hosts also performs a process that includes the following steps:

1. Scrubs the device extents metadata table, and find any entries marked as "invalid."

2. Erases the actual data stored in the cache card LRU as that data is stale.

3. Returns the space used to store the data extent to the LRU free list.

The MPIO driver portions of example processes described above are assumed to be similarly performed by other MPIO drivers on respective other host devices having local memory and RDMA capability. Such MPIO drivers illustratively form at least a portion of a multi-path layer comprising multi-pathing software of the host devices.

The above-described processes and other features and functionality disclosed herein are presented by way of illustrative example only, and other embodiments can utilize additional or alternative arrangements. For example, certain process steps described in conjunction with the algorithms herein as being performed serially can instead be performed at least in part in parallel with one another.

Also, as mentioned previously, different instances of the above-described algorithms and other local cached data coherency techniques can be performed by different MPIO drivers, other types of host drivers or additional or alternative host components in respective different host devices.

The illustrative embodiments disclosed herein can provide a number of significant advantages relative to conventional arrangements.

For example, some embodiments configure a multi-path layer of one or more host devices to include functionality for local cached data coherency via RDMA that provides enhanced overall IO processing performance.

Such embodiments avoid the difficulties of conventional practice in maintaining local cached data coherency among different host devices that access the same logical storage devices of a storage system.

Illustrative embodiments can provide local cached data coherency in a multiple host environment in which not all hosts have RDMA capability. For example, such embodiments avoid the requirement that all cluster members of a large scale cluster have the same configuration, and therefore allow a large scale cluster to have multiple distinct host configurations, while also being less costly to implement.

Accordingly, some embodiments leverage a multi-path layer of one or more host devices to provide enhanced performance in processing of IO operations directed to one or more storage arrays or other types of storage systems.

These and other arrangements are advantageously configured to provide local cache coherency even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage array 105 are illustratively implemented in the form of software running on one or more processing devices. As a more particular example, the instances of cache coherency logic 114 may be implemented at least in part in software, as indicated previously herein.

It should again be emphasized that the above-described embodiments are presented for purposes of illustration only.

Many variations and other alternative embodiments may be used. For example, the disclosed techniques are applicable to a wide variety of other types of information processing systems, utilizing other arrangements of host devices, networks, storage systems, storage arrays, storage devices, processors, memories, local caches, MPIO drivers, cache coherency logic and additional or alternative components. Also, the particular configurations of system and device elements and associated processing operations illustratively shown in the drawings can be varied in other embodiments. For example, a wide variety of different MPIO driver configurations and associated local cached data coherency arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a first host device comprising a processor coupled to a memory;
where the first host device is configured:
to establish connectivity to a logical storage device of a storage system;
to obtain from the storage system, via direct interaction between the first host device and the storage system, host connectivity information identifying at least a second host device that has also established connectivity to the logical storage device of the storage system;
to cache one or more extents of the logical storage device in the memory of the first host device;
to maintain local cache metadata in the first host device regarding the one or more extents of the logical storage device cached in the memory of the first host device; and
in conjunction with processing of a write operation of the first host device involving at least one of the one or more cached extents of the logical storage device, to invalidate corresponding entries in the local cache metadata of the first host device and in local cache metadata maintained in the second host device.

2. The apparatus of claim 1 wherein the memory of the first host device comprises one or more cache cards of the first host device.

3. The apparatus of claim 1 wherein each of the extents of the logical storage device comprises one or more pages of the logical storage device.

4. The apparatus of claim 1 wherein the first host device further comprises a multi-path layer comprising at least one multi-path input-output driver configured to control delivery of input-output operations from the first host device over selected paths to particular ports of the storage system and wherein the multi-path input-output driver controls performance of at least a subset of the establishing, obtaining, caching, maintaining and invalidating.

5. The apparatus of claim 1 wherein obtaining from the storage system host connectivity information identifying at least a second host device that has also established connectivity to the logical storage device of the storage system comprises obtaining the connectivity information directly from the storage system utilizing an in-band communication mechanism in which one or more commands in a designated storage protocol are sent from the first host device to the storage system.

6. The apparatus of claim 5 wherein the one or more commands comprise at least a host registration command sent from the first host device to the storage system in conjunction with the first host device establishing connectivity to the logical storage device.

7. The apparatus of claim 1 wherein the first host device is further configured to store information specifying a location of the local cache metadata maintained in the second host device and to directly invalidate entries in the local cache metadata of the second host device via remote direct memory access.

8. The apparatus of claim 1 wherein the first host device is further configured to maintain a host connectivity information table that stores, for each a plurality of other host devices including the second host device, identifiers of one or more logical storage devices of the storage system to which those other host devices have established connectivity.

9. The apparatus of claim 1 wherein the local cache metadata maintained in the first host device comprises a logical storage device extents table having a plurality of entries for respective extents of the logical storage device with each such entry comprising an indication of whether or not the corresponding extent is cached in the memory of the first host device and if the corresponding extent is cached in the memory of the first host device, an address in the memory of the first host device at which the corresponding extent is cached.

10. The apparatus of claim 1 wherein the first host device is further configured, in conjunction with processing of a read operation:
to determine if one or more extents targeted by the read operation are cached in the memory of the first host device;
responsive to the one or more extents being cached in the memory of the first host device, reading the one or more extents from the memory, and returning the one or more extents to an application that generated the read operation; and
responsive to the one or more extents not being cached in the memory of the first host device, reading the one or more extents from the storage system, returning the one or more extents to the application that generated the read operation, caching the one or more extents in the memory of the first host device, and updating the local cache metadata maintained in the first host device.

11. The apparatus of claim 1 wherein the first host device is further configured, in conjunction with processing of the write operation:
to identify one or more additional host devices, including the second host device, that have established connectivity to the logical storage device;
to determine locations in respective ones of the one or more additional host devices of local cache metadata maintained in the one or more additional host devices;
to invalidate entries corresponding to one or more extents targeted by the write operation in the local cache metadata of the first and additional host devices;
to send the write operation to the storage system; and
responsive to an acknowledgement of the write operation from the storage system, to acknowledge completion of the write operation to an application that generated the write operation.

12. The apparatus of claim 11 wherein invalidating entries in the local cache metadata of the first and additional host devices comprises invalidating the entries of the local cache metadata of the one or more additional host devices via remote direct memory access.

13. The apparatus of claim 1 wherein the first host device and one or more additional host devices, including the second host device, are each further configured:
to remove any invalidated entries from local cache metadata in that host device; and
to release corresponding space in a memory of that host device so as to make the space available for caching of other extents in the memory of that host device.

14. The apparatus of claim 1 wherein the first and second host devices are part of a first group of host devices each having remote direct memory access functionality, the storage system being shared by the first group of host devices and a second group of host devices, the second group of host devices each not having remote direct memory access functionality, wherein different types of write processing are performed by the storage system depending on whether a given write operation is received from a host device of the first group or a host device of the second group.

15. A method performed by a first host device, the first host device comprising a processor coupled to a memory, the method comprising:
establishing connectivity to a logical storage device of a storage system;
obtaining from the storage system, via direct interaction between the first host device and the storage system, host connectivity information identifying at least a second host device that has also established connectivity to the logical storage device of the storage system;
caching one or more extents of the logical storage device in the memory of the first host device;
maintaining local cache metadata in the first host device regarding the one or more extents of the logical storage device cached in the memory of the first host device; and
in conjunction with processing of a write operation of the first host device involving at least one of the one or more cached extents of the logical storage device, invalidating corresponding entries in the local cache metadata of the first host device and in local cache metadata maintained in the second host device.

16. The method of claim 15 wherein the first host device is further configured to store information specifying a location of the local cache metadata maintained in the second host device and to directly invalidate entries in the local cache metadata of the second host device via remote direct memory access.

17. The method of claim 15 wherein the first host device is further configured, in conjunction with processing of the write operation:
to identify one or more additional host devices, including the second host device, that have established connectivity to the logical storage device;
to determine locations in respective ones of the one or more additional host devices of local cache metadata maintained in the one or more additional host devices;
to invalidate entries corresponding to one or more extents targeted by the write operation in the local cache metadata of the first and additional host devices;
to send the write operation to the storage system; and
responsive to an acknowledgement of the write operation from the storage system, to acknowledge completion of the write operation to an application that generated the write operation.

18. A computer program product comprising a non-transitory processor-readable storage medium having stored therein program code of one or more software programs, wherein the program code, when executed by a first host device comprising a processor coupled to a memory, causes the first host device:
to establish connectivity to a logical storage device of a storage system;
to obtain from the storage system, via direct interaction between the first host device and the storage system, host connectivity information identifying at least a second host device that has also established connectivity to the logical storage device of the storage system;
to cache one or more extents of the logical storage device in the memory of the first host device;
to maintain local cache metadata in the first host device regarding the one or more extents of the logical storage device cached in the memory of the first host device; and
in conjunction with processing of a write operation of the first host device involving at least one of the one or more cached extents of the logical storage device, to invalidate corresponding entries in the local cache metadata of the first host device and in local cache metadata maintained in the second host device.

19. The computer program product of claim 18 wherein the first host device is further configured to store information specifying a location of the local cache metadata maintained in the second host device and to directly invalidate entries in the local cache metadata of the second host device via remote direct memory access.

20. The computer program product of claim 18 wherein the first host device is further configured, in conjunction with processing of the write operation:
to identify one or more additional host devices, including the second host device, that have established connectivity to the logical storage device;
to determine locations in respective ones of the one or more additional host devices of local cache metadata maintained in the one or more additional host devices;
to invalidate entries corresponding to one or more extents targeted by the write operation in the local cache metadata of the first and additional host devices;
to send the write operation to the storage system; and
responsive to an acknowledgement of the write operation from the storage system, to acknowledge completion of the write operation to an application that generated the write operation.

* * * * *